Figure 1:
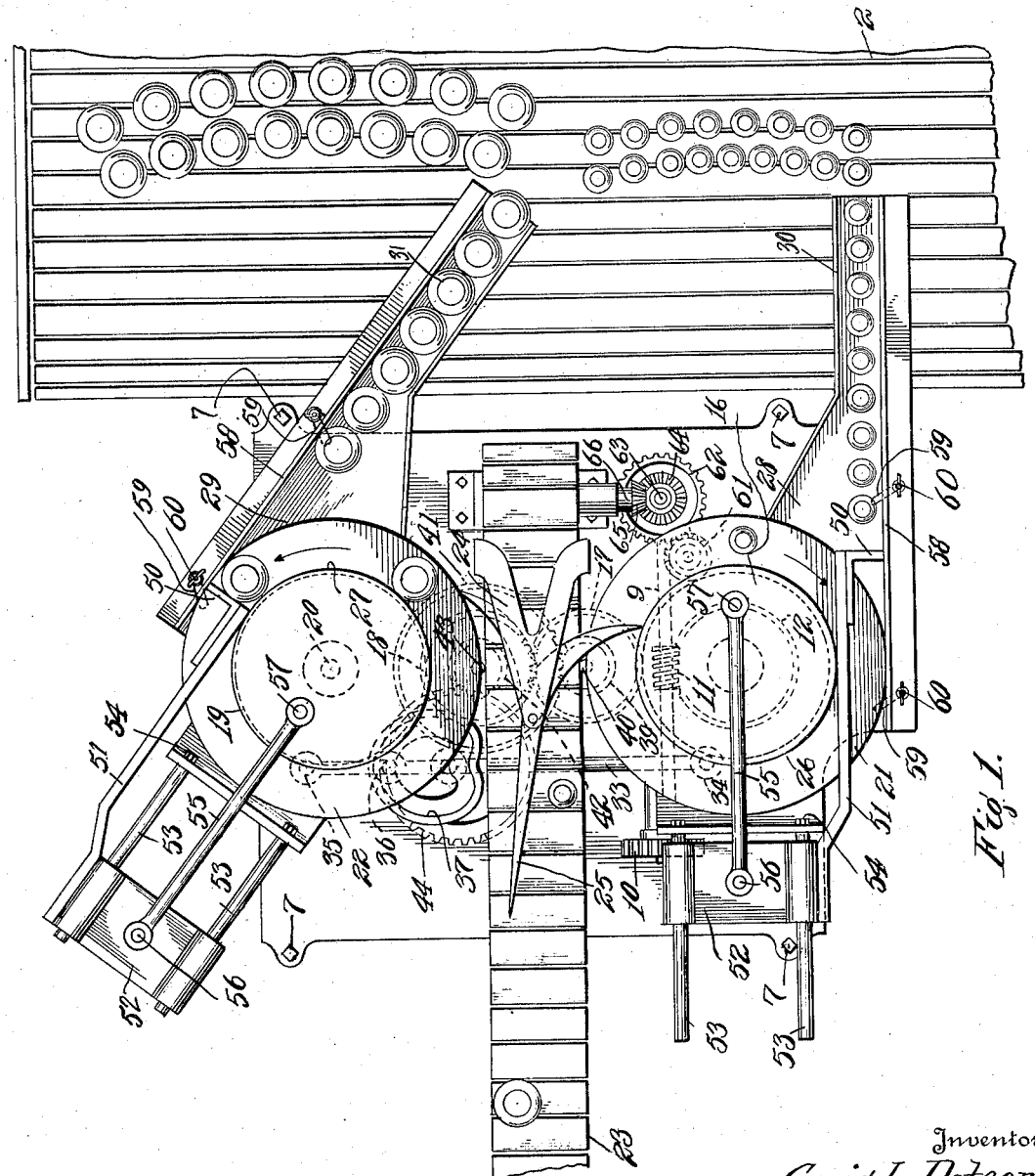

Jan. 7, 1930.  C. L. DOTSON  1,742,239
LEER FEEDER
Filed Aug. 26, 1926   2 Sheets-Sheet 1

Inventor
Craig L. Dotson
By Eccleston & Eccleston
Attorney

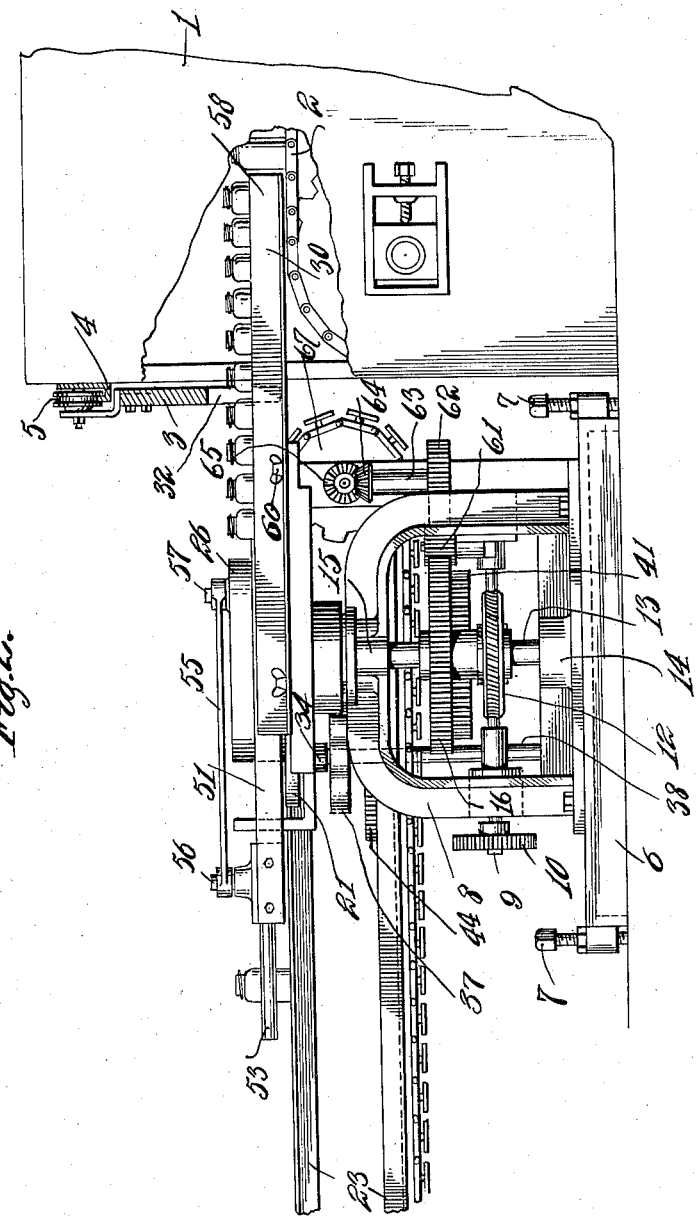

Patented Jan. 7, 1930

1,742,239

UNITED STATES PATENT OFFICE

CRAIG L. DOTSON, OF WASHINGTON, PENNSYLVANIA

LEER FEEDER

Application filed August 26, 1926. Serial No. 131,668.

This invention relates to mechanisms for mechanically feeding glassware to an annealing furnace, and has for its object to provide a relatively simple and compact machine by which the ware may be arranged in the leer in a regular and orderly manner.

Another object of the invention resides in the construction of a leer feeder which will function to automatically distribute to a leer the ware from a single forming machine or from two machines; in the latter case the ware from the two machines being segregated in the leer so that the product of each machine will occupy a predetermined portion of the leer conveyer.

A further object of the invention consists in the provision of a leer feeder which, will serve to deliver ware of varying sizes.

A still further object of the invention resides in the construction of a mechanism of the foregoing type which is adapted to load glassware into a leer in an upright position, or, where the ware is long and has a small base will deliver it on its side with the same facility as it delivers ware in an upright position.

Other objects and advantages of the invention will be apparent from the following description when considered in connection with the accompanying drawings; in which Figure 1 is a plan view of the feeder in operation; and Figure 2 is a side elevation thereof.

Referring to the drawing in greater detail the numeral 1 indicates a leer provided with the usual conveyer 2 for the ware, and having a slidably-mounted door 3 suspended from the rail 4 by means of rollers 5, and which is adapted to be moved back and forth across the front of the leer by the feeder chutes in a manner hereinafter described.

The feeder proper is mounted on a base plate 6 which is provided with leveling screws 7, and to which an upwardly arched bracket 8 is secured. Mounted for rotation in bearings carried by the bracket 8 is the horizontally extending drive shaft 9, and keyed to this shaft is a gear wheel 10 and a worm gear 11; the former being driven by a motor (not shown). The worm gear 11 operates a worm wheel 12 keyed to a vertical shaft 13 which is mounted in bearings 14 and 15 on the bracket 8; also keyed to shaft 13 is a gear wheel 16 which meshes with a gear wheel 17 of the intermediate gears 17—18; the latter in turn meshing with the driven gear 19. The gear 19 is keyed to the vertical shaft 20 which is mounted in suitable bearings on the bracket 8, and due to the intermediate gearing 17—18 it will be apparent that the two shafts 13 and 20 will rotate in opposite directions as shown by the arrows (Fig. 1).

Keyed to the upper ends of the shafts 13 and 20 are the discs 21 and 22 having their respective peripheries contiguous to and level with a conveyer 23 which extends from the forming machine or machines (not shown) and which forming machines may be remote from or adjacent to the leer feeder, as will be readily understood. Mounted for oscillating movement on a bracket 24 over the conveyer 23 is a deflector 25, and obviously as the bottle or other ware is carried against the guide it will be deflected from the conveyer 23 to one or the other of the discs 21—22. As the particular article of glassware takes its position on the disc it will be carried around by the latter until it exerts sufficient pressure on the swallow tail portion of the deflector, to swing the point of the deflector across the conveyer 23 so that the succeeding article carried by the conveyer will be deflected to the other one of the two discs. The ware after being received on the discs 21 and 22 is prevented from being forced toward the center thereof by means of the upper discs or bosses 26 and 27 respectively.

Mounted for oscillation, about shafts 13 and 20 as centers, just below the discs 21 and 22, are guide plates 28 and 29 which terminate at their forward ends in guides or chutes 30 and 31 respectively. These guides or chutes 30—31 pass through openings 32 in the leer door 3 and extend just above the conveyer 2 of the leer. As the chutes are swung back and forth by the mechanism about to be described the door 3 is also caused to slide back and forth on the rail 4 thus maintaining the front of the leer always closed so as to retain the heat therein.

In order that these guides or chutes 30 and 31 may be oscillated to uniformly distribute the ware over the leer conveyer 2, the guide plates 28 and 29, of which the chutes are an integral part, are connected by means of a rod 33 which has its ends secured to wrist pins 34 and 35 on the under side of the guide plates. This connecting rod 33 carries a cam roller 36 intermediate its ends which cooperates with a uniform speed cam 37 keyed to a shaft 38. By a train of reducing gearing including the gear wheel 39 fixed to the shaft 40, gear wheels 41 and 42 operatively connected together but loosely mounted on shaft 43, and gear wheel 44 fixed to shaft 38, the cam 37 is slowly rotated so as to cause an oscillation of the chutes across the conveyer.

As the chutes slowly traverse the leer conveyer 2 the ware is fed therefrom, and this feeding operation is accomplished by means of pushers 50 which are removably secured to pusher rods 51 in order to suit ware of varying dimensions. The pusher rods 51 are bolted to slides 52 which are mounted on slide rods 53 the latter being anchored to the rear ends of the guide plates 28 and 29 as indicated by numeral 54. Reciprocating movement is imparted to the slides 52 and pushers 50 by means of links 55 which are attached to wrist pins 56 and 57 on the slides 52 and the upper discs of bosses 26—27. Obviously, therefore, as the feeder is operated through main drive shaft 9 and the related gearing, the pushers 50 are reciprocated to eject the ware from the discs 21 and 22 after it is carried around and brought into contact with the guard plates 58 which are adjustably mounted on the plates 28 and 29 by means of the slots 59 and set screws 60. This adjustment adapts the feeder to accommodate ware of various widths.

The conveyer 23 is driven by means of gear wheel 16 which meshes with an intermediate gear 61 which in turn meshes with a gear wheel 62 fixed on shaft 63. Also fixed on shaft 63 is a mitre gear 64 which meshes with a mitre gear 65 carried by the horizontal shaft 66, and on which is fixed a sprocket wheel 67 for operating the conveyer.

In the operation of the feeder in conjunction with a single forming machine, the articles will be carried along by the conveyer 23 and will be alternately switched over by the deflector 25 to one disc 21—22 and then to the other. The articles are then carried in the direction of the arrows (Fig. 1) until they come in line with the pushers 50 which are reciprocated through the medium of the connecting links 55 and discs 21—22. The articles are thus moved along the chutes 30—31, as indicated in Figure 1, to the leer conveyer 2. While the articles are being pushed along the chutes 30—31 to the leer conveyer 2, the chutes are being oscillated through the medium of the cam 37 and connecting rod 33, and thus serve to arrange the articles in rows transversely of the leer as indicated in Figure 1. If it is desired to employ the feeder with articles of a different width from those shown the width of the chute may be altered by means of the adjusting screws 60.

Where the apparatus is used with two forming machines the articles will be placed on opposite sides of the conveyer 23, and in lieu of the pivoted distributer 25 a fixed distributer of wedge shape may be used for guiding the articles from each side of the conveyer to their respective discs 21—22.

From the foregoing description, and the accompanying drawings, it will be apparent that I have devised a leer feeder which is efficient in operation and of relatively few parts; which will feed articles from two forming machines, or from a single forming machine, to a leer in such a manner that the ware is maintained in two segregated groups; which will feed articles while lying on their sides or in upright position; and which is adjustable for articles of varying sizes.

In accordance with the patent statutes I have described what I now believe to be the best embodiment of the invention, but it will be apparent that various changes and modifications may be made without departing from the spirit of the invention; all such I aim to include within the scope of the appended claims.

What I claim as new and desire to secure by Letters Patent is:

1. A leer feeder including a plurality of guides for delivering glassware to a leer, means for oscillating said guides to arrange the ware in the leer, a rotatable member associated with each of said guides, a conveyer common to said members, and means adapted to feed the ware from said members to said guides.

2. A leer feeder including a plurality of guides for delivering glassware to a leer, means for oscillating said guides to arrange the ware in the leer, a rotatable member associated with each of said guides, means for feeding ware to said members, and reciprocable elements adapted to feed the ware from said members to said guides.

3. A leer feeder including a plurality of guides for delivering glassware to a leer, means for oscillating said guides, a rotatable disc associated with each of said guides, a reciprocable pusher associated with each disc for feeding the ware from the discs to the guides, a conveyer arranged between the discs, and a deflector for distributing the ware from said conveyer to said discs.

4. A leer feeder including a plurality of guides for delivering glassware to a leer, means for oscillating said guides, a rotatable disc associated with each of said guides, a reciprocable pusher associated with each disc for feeding the ware from the discs to the guides, a conveyer common to the discs, and an oscillating deflector for distributing the ware from said conveyer to said discs.

5. A leer feeder including a guide for delivering glassware to a leer, means for moving said guide back and forth, a rotatable disc associated with the guide, and a reciprocable pusher for delivering the ware from the disc to the guide.

6. A leer feeder including a guide for delivering glassware to a leer, means for oscillating said guide, a conveyer for transporting the ware to the leer feeder, a rotary disc receiving the ware from said conveyer, and a reciprocable pusher for delivering the ware from said disc to said guide and then to the leer.

7. A leer feeder including a conveyer for transporting the ware to the leer feeder, a rotary disc, a deflector for distributing the ware from said conveyer to said disc, a guide, a reciprocable member for feeding the ware from said disc to said guide, and means for oscillating said guide.

CRAIG L. DOTSON.